(12) United States Patent
Woodrum

(10) Patent No.: US 9,961,829 B2
(45) Date of Patent: May 8, 2018

(54) WALK-BEHIND MOWER WITH STEERING WHEEL CONTROL

(71) Applicant: MTD PRODUCTS INC, Valley City, OH (US)

(72) Inventor: Adam Woodrum, Wakeman, OH (US)

(73) Assignee: MTD Products Inc, Valley City, OH (US)

( * ) Notice: Subject to any disclaimer, the term of this patent is extended or adjusted under 35 U.S.C. 154(b) by 0 days. days.

(21) Appl. No.: 15/174,766

(22) Filed: Jun. 6, 2016

(65) Prior Publication Data

US 2016/0353658 A1  Dec. 8, 2016

Related U.S. Application Data

(60) Provisional application No. 62/171,732, filed on Jun. 5, 2015.

(51) Int. Cl.
*A01D 34/00* (2006.01)
*A01D 34/68* (2006.01)
(Continued)

(52) U.S. Cl.
CPC ......... *A01D 34/6806* (2013.01); *A01D 34/68* (2013.01); *A01D 34/685* (2013.01);
(Continued)

(58) Field of Classification Search
CPC ..... E01D 34/67; E01D 34/68; E01D 34/6806; E01D 34/81; E01D 34/824; A01D 34/67;
(Continued)

(56) References Cited

U.S. PATENT DOCUMENTS

| 487,198 A | 11/1892 | John |
| 956,718 A | 5/1910 | Mustin |

(Continued)

FOREIGN PATENT DOCUMENTS

| AT | 327586 T | 6/2006 |
| AT | 333781 T | 8/2006 |

(Continued)

OTHER PUBLICATIONS

International Search Report and Written Opinion for International Application No. PCT/US2016/036044 dated Aug. 5, 2016.
(Continued)

*Primary Examiner* — Thomas B Will
*Assistant Examiner* — Joan D Misa
(74) *Attorney, Agent, or Firm* — Wegman, Hessler & Vanderburg

(57) ABSTRACT

A walk-behind mower includes a frame and a power source attached to the frame. A selectively steerable drive wheel and a set of follower wheels are rotatably attached to the frame. The walk-behind mower includes a steering wheel assembly attached to the frame, the assembly including a steering column and a steering wheel attached to the steering column. The walk-behind mower also includes a universal joint connecting the steering wheel assembly to the frame. The walk-behind mower further includes a mower deck attached to the frame and a mower blade assembly attached to the deck. In other examples, the walk-behind mower includes a front section and a rear section that rotate relative to each other about a vertical axis.

6 Claims, 6 Drawing Sheets

(51) Int. Cl.
*A01D 34/81* (2006.01)
*A01D 34/82* (2006.01)
*A01D 34/685* (2006.01)
*A01D 34/69* (2006.01)
A01D 101/00 (2006.01)

(52) U.S. Cl.
CPC ............ *A01D 34/69* (2013.01); *A01D 34/81* (2013.01); *A01D 34/824* (2013.01); *A01D 2101/00* (2013.01)

(58) Field of Classification Search
CPC .... A01D 34/68; A01D 34/6806; A01D 34/81; A01D 34/824; A01D 34/685; A01D 34/69
See application file for complete search history.

(56) References Cited

U.S. PATENT DOCUMENTS

| | | | |
|---|---|---|---|
| 1,389,249 A | | 8/1921 | Kitchel |
| 1,428,231 A | | 9/1922 | Hicks |
| 1,625,886 A | | 4/1927 | Andrew |
| 1,876,963 A | | 9/1932 | Klass |
| 1,914,782 A | * | 6/1933 | McCarty ............... A01D 34/62 56/249 |
| 2,027,289 A | | 1/1936 | Randolph |
| 2,038,697 A | | 4/1936 | Winslow |
| 2,477,442 A | | 7/1949 | Cramer |
| 2,582,177 A | | 1/1952 | Swisher |
| 2,763,116 A | | 9/1956 | Flinchbaugh |
| 2,809,490 A | | 10/1957 | Oeters |
| 2,850,003 A | | 9/1958 | Konle |
| 2,919,756 A | * | 1/1960 | Knipe .................... A01D 34/64 180/11 |
| 3,029,887 A | | 4/1962 | Schantz |
| 3,058,287 A | | 10/1962 | Beaman |
| 3,196,971 A | | 7/1965 | Schantz |
| 3,382,653 A | | 5/1968 | Buigne |
| 3,411,276 A | | 11/1968 | Buigne |
| 3,561,200 A | | 2/1971 | Minunno |
| 3,773,112 A | | 11/1973 | Zinck |
| 3,780,504 A | * | 12/1973 | Haseloff ............... A01D 34/685 56/13.6 |
| 4,024,695 A | * | 5/1977 | Haseloff ............... A01D 34/685 180/19.2 |
| 4,033,098 A | | 7/1977 | Green |
| 4,378,668 A | | 4/1983 | Gullett |
| D285,079 S | | 8/1986 | Huthmacher |
| 4,633,658 A | | 1/1987 | Nogawa |
| 4,738,084 A | | 4/1988 | Ogano |
| D295,865 S | | 5/1988 | Rosenblad |
| 5,297,379 A | | 3/1994 | Smith |
| 5,713,420 A | | 2/1998 | Roberts et al. |
| D424,070 S | | 5/2000 | Danthois |
| 6,681,865 B2 | | 1/2004 | Pace |
| D500,054 S | | 12/2004 | Jager |
| 6,874,307 B2 | | 4/2005 | Reincke |
| D508,923 S | | 8/2005 | Henssler et al. |
| D508,924 S | | 8/2005 | Henssler et al. |
| D605,667 S | | 12/2009 | Peterson |
| D646,698 S | | 10/2011 | Park |
| 2003/0041578 A1 | | 3/2003 | Fuller |
| 2005/0097875 A1 | | 5/2005 | Haeufele et al. |
| 2006/0076152 A1 | | 4/2006 | Haufele et al. |
| 2013/0305675 A1 | | 11/2013 | Pare |
| 2014/0260153 A1 | | 9/2014 | Blank |

FOREIGN PATENT DOCUMENTS

| | | |
|---|---|---|
| CA | 2435943 A1 | 8/2002 |
| CA | 108022 S | 11/2006 |
| CA | 108023 S | 11/2006 |
| CN | 1499924 A | 5/2004 |
| CN | 1250069 C | 4/2006 |
| CN | 101006759 B | 5/2010 |
| CN | 102265728 | 12/2011 |
| DE | 2408964 | 9/1975 |
| DE | 3136142 | 3/1983 |
| DE | 3136143 | 3/1983 |
| DE | 10214679 | 10/2003 |
| DE | 10215062 | 10/2003 |
| DE | 102004020985 | 11/2005 |
| DE | 102008045913 | 3/2010 |
| DK | 1357782 T3 | 11/2006 |
| EP | 74489 | 3/1983 |
| EP | 142453 B1 | 5/1985 |
| EP | 1030546 A1 | 8/2000 |
| EP | 1119291 A1 | 2/2002 |
| EP | 1351363 A2 | 10/2003 |
| EP | 1351782 A1 | 11/2003 |
| EP | 1351363 A3 | 1/2005 |
| EP | 1351363 B1 | 1/2005 |
| EP | 1351782 B1 | 7/2006 |
| EP | 1191415 B1 | 6/2008 |
| FR | 2580561 A1 | 10/1986 |
| FR | 2837770 B1 | 5/2005 |
| GB | 2386813 B | 6/2005 |
| GB | 23868138 B | 6/2005 |
| GB | 2441203 A | 2/2008 |
| JP | 05-038218 A | 2/1993 |
| JP | H10191746 | 7/1998 |
| JP | 2007053992 A | 3/2007 |
| WO | 8808685 | 11/1988 |
| WO | 9202121 A1 | 2/1992 |
| WO | 2000050288 A1 | 8/2000 |
| WO | 02/062126 | 8/2002 |
| WO | 2002062126 A1 | 8/2002 |
| WO | 2006027218 | 3/2006 |
| ZA | 200305916 A | 8/2004 |

OTHER PUBLICATIONS

"Electric Flexible Steerable Lawnmower 34 E easyMove (4034)" gardena.com http://www.gardena.com/int/lawn-care/lawn-mower/34-e-easymove/ Discloses a steerable lawn mower. Last accessed: May 14, 2015.

"McCulloch Electric Mower" http://blueskydesigngroup.com.au/ http://blueskydesigngroup.com.au/project/mcculloch-mower/ Discloses an electric mower utilizing steer-able front wheels that allow the product to be maneuvered around the lawn more easily than a traditional mower. Last accessed: May 14, 2015.

* cited by examiner

WALK-BEHIND MOWER WITH STEERING WHEEL CONTROL

CROSS-REFERENCE TO RELATED APPLICATIONS

This application is related to U.S. Provisional Patent Application Ser. No. 62/171,732, filed Jun. 5, 2015, which is hereby fully incorporated herein.

BACKGROUND

1. Field of the Disclosure

The present disclosure is directed to mowers and more particularly, a walk-behind mower with steering wheel control.

2. Description of Related Art

Some known mowers have rigid controls such as a handle that require the operator to walk around obstacles and U-turns with the handle of the mower. This can cause unnecessary walking during turns and avoidance of obstacles for the operator.

Accordingly, there is a need for a mower that can be easily controlled with a steering wheel.

SUMMARY

According to one embodiment of the present disclosure, a walk-behind mower includes a frame and a power source attached to the frame. The walk-behind mower also includes a selectively steerable drive wheel rotatably attached to said frame. The walk-behind mower further includes a set of follower wheels attached to the frame. The walk-behind mower still further includes a steering wheel assembly attached to the frame. The steering wheel assembly includes a steering column and a steering wheel attached to the steering column. The walk-behind mower also includes a universal joint connecting the steering wheel assembly to the frame. The walk-behind mower further includes a mower deck attached to the frame and a mower blade assembly attached to the deck.

Advantages of the present disclosure will become more apparent to those skilled in the art from the following description of the embodiments of the disclosure which have been shown and described by way of illustration. As will be realized, the described apparatus and method are capable of other and different embodiments, and their details are capable of modification in various respects.

BRIEF DESCRIPTION OF THE DRAWINGS

These and other features of the present disclosure, and their advantages, are illustrated specifically in embodiments of the disclosure now to be described, by way of example, with reference to the accompanying diagrammatic drawings, in which.

Figure 1:
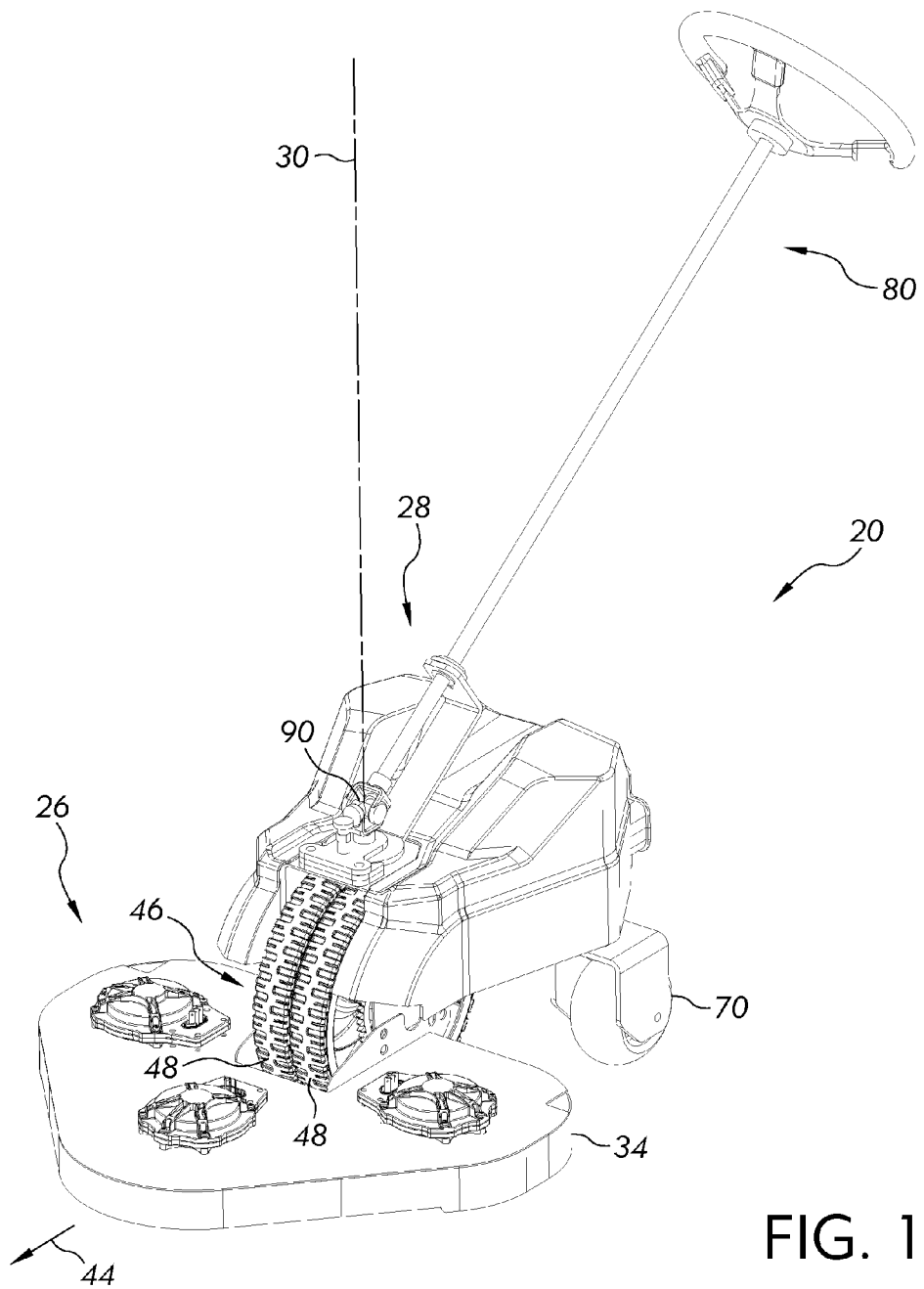
FIG. 1 is a perspective view of an embodiment of a mower of the present disclosure.
Figure 2:
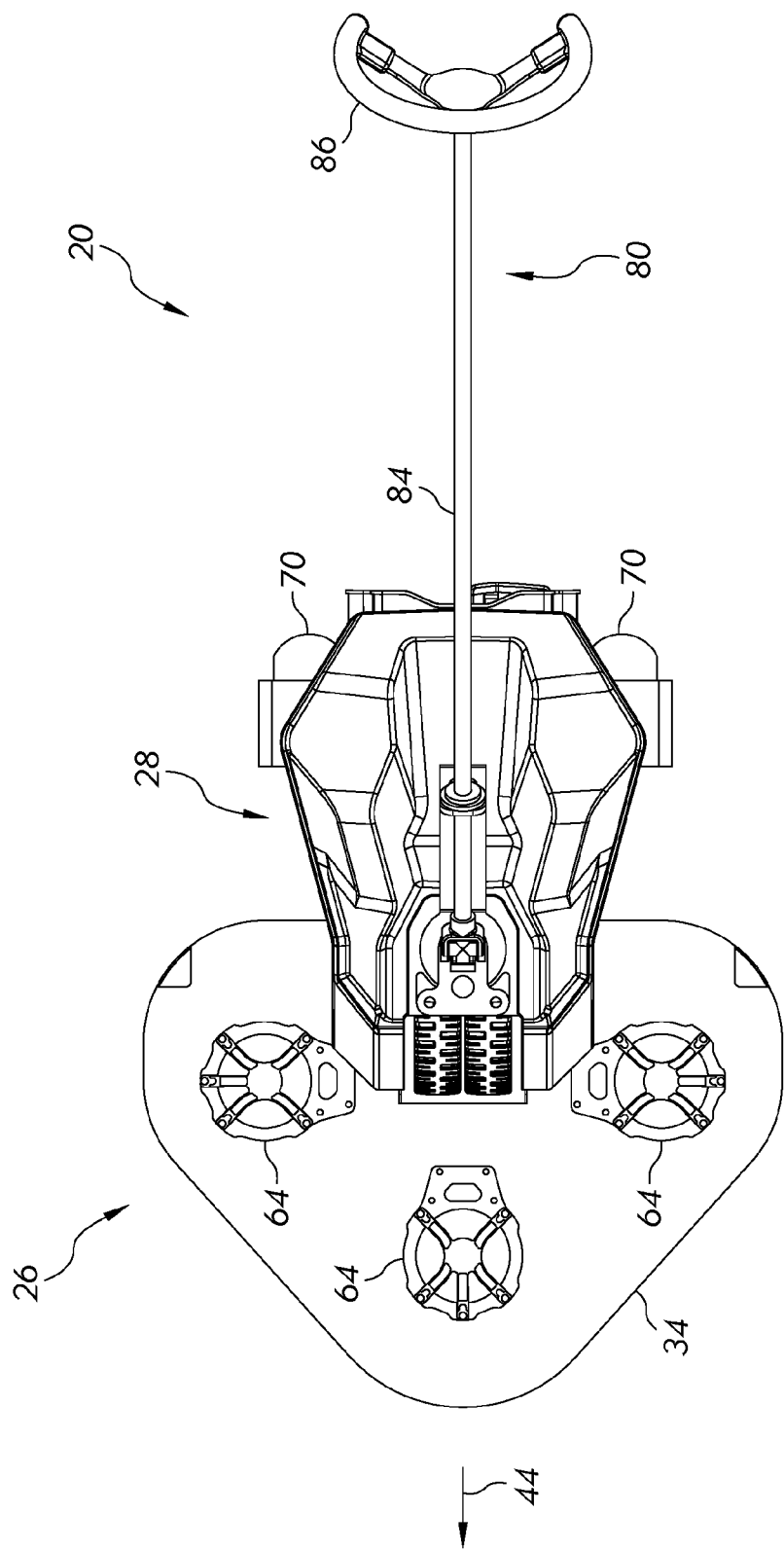
FIG. 2 is a top view of the mower of FIG. 1.
Figure 3:
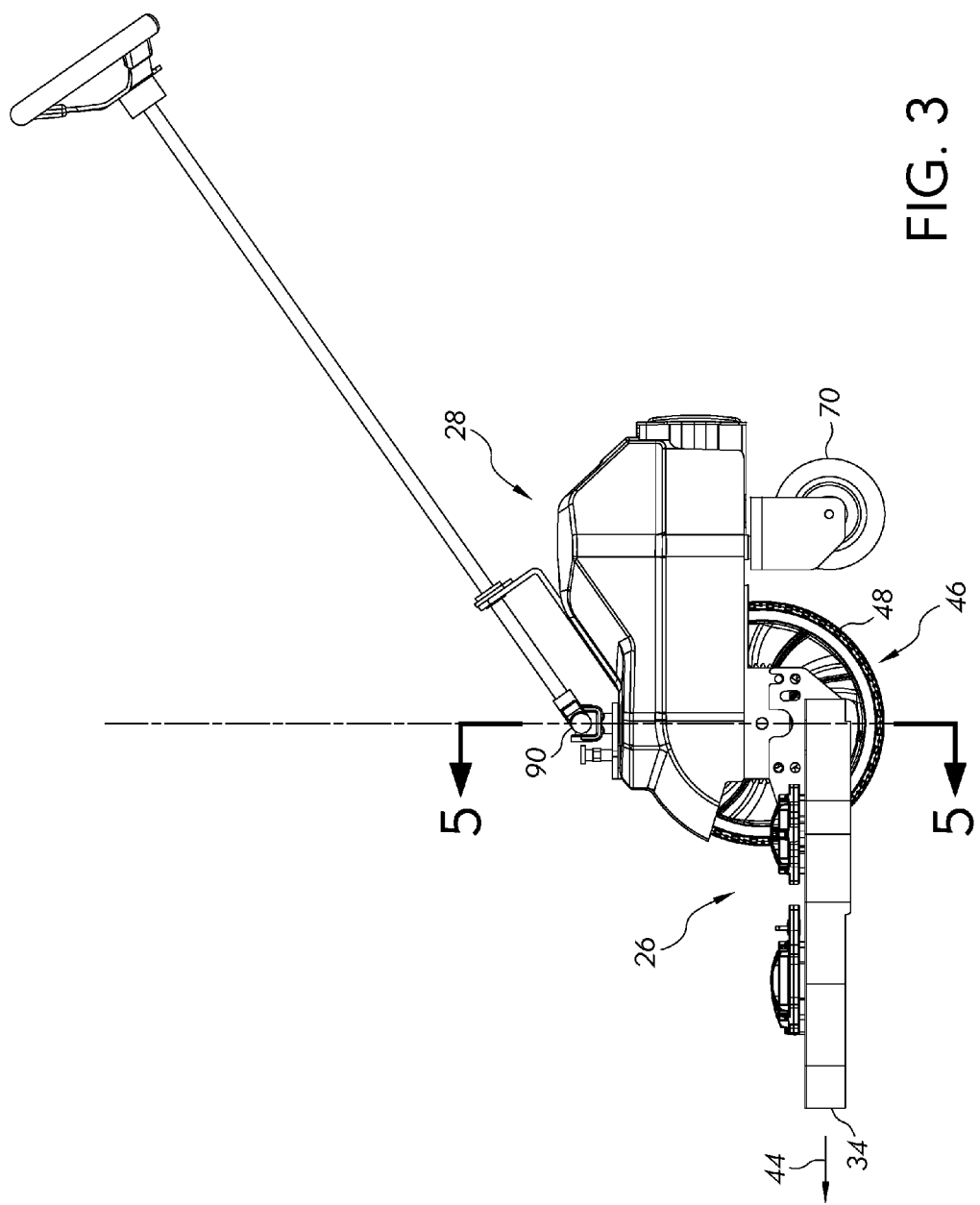
Figure 4:
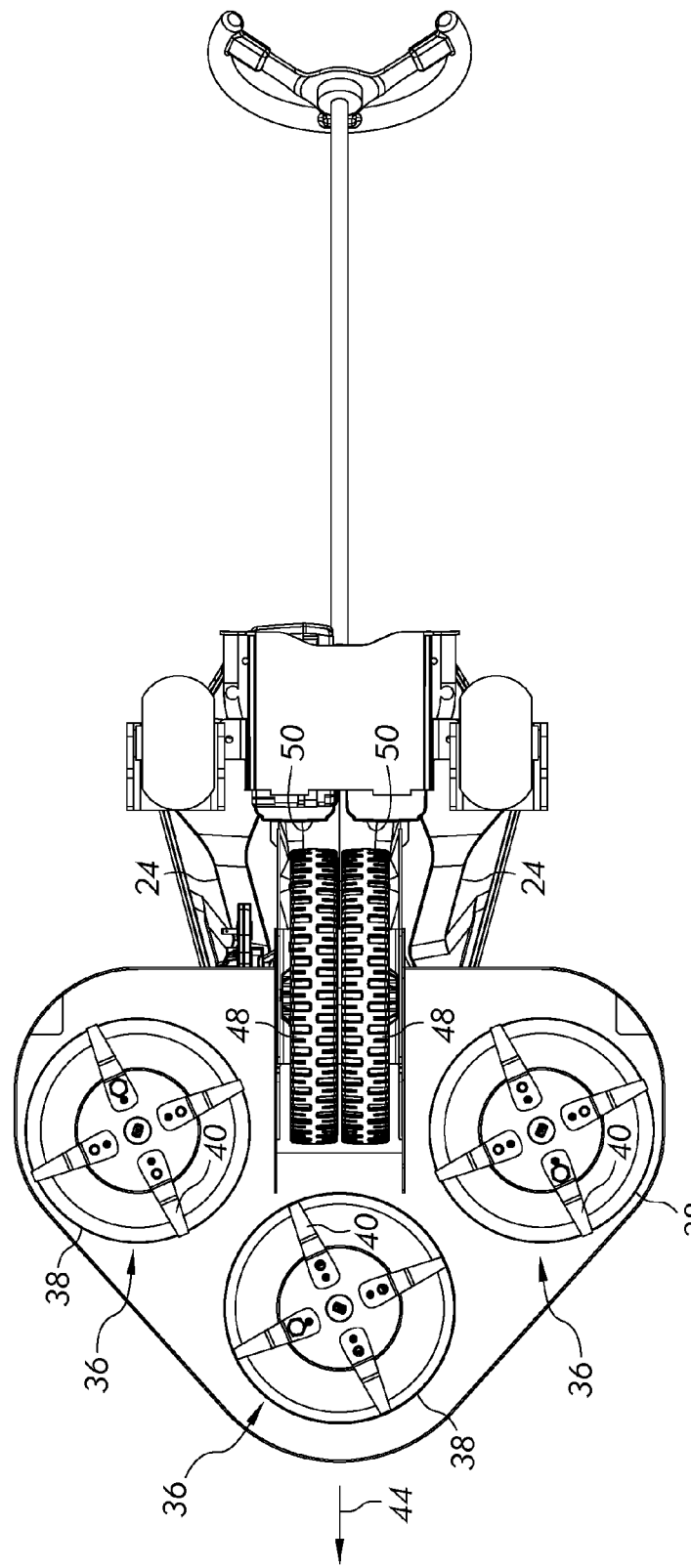
Figure 5:
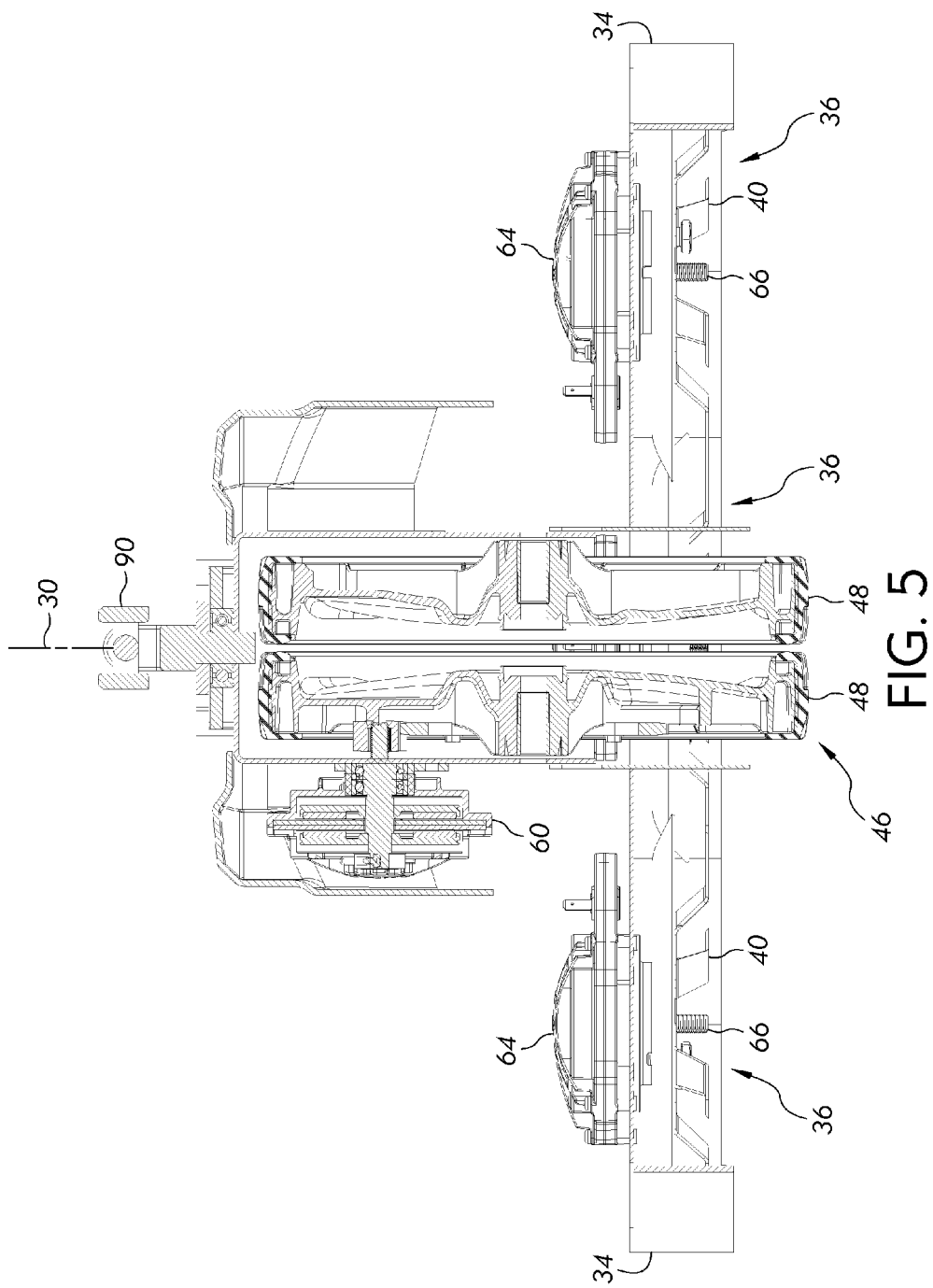

detail view of the mower of FIG. 1, showing the underside of the deck;

FIG. 3 is an elevation view of the mower of FIG. 1;

FIG. 4 is an underside of the mower of FIG. 1;

FIG. 5 is a cross-section view taken along line 5-5 of FIG. 3; and

Figure 6:
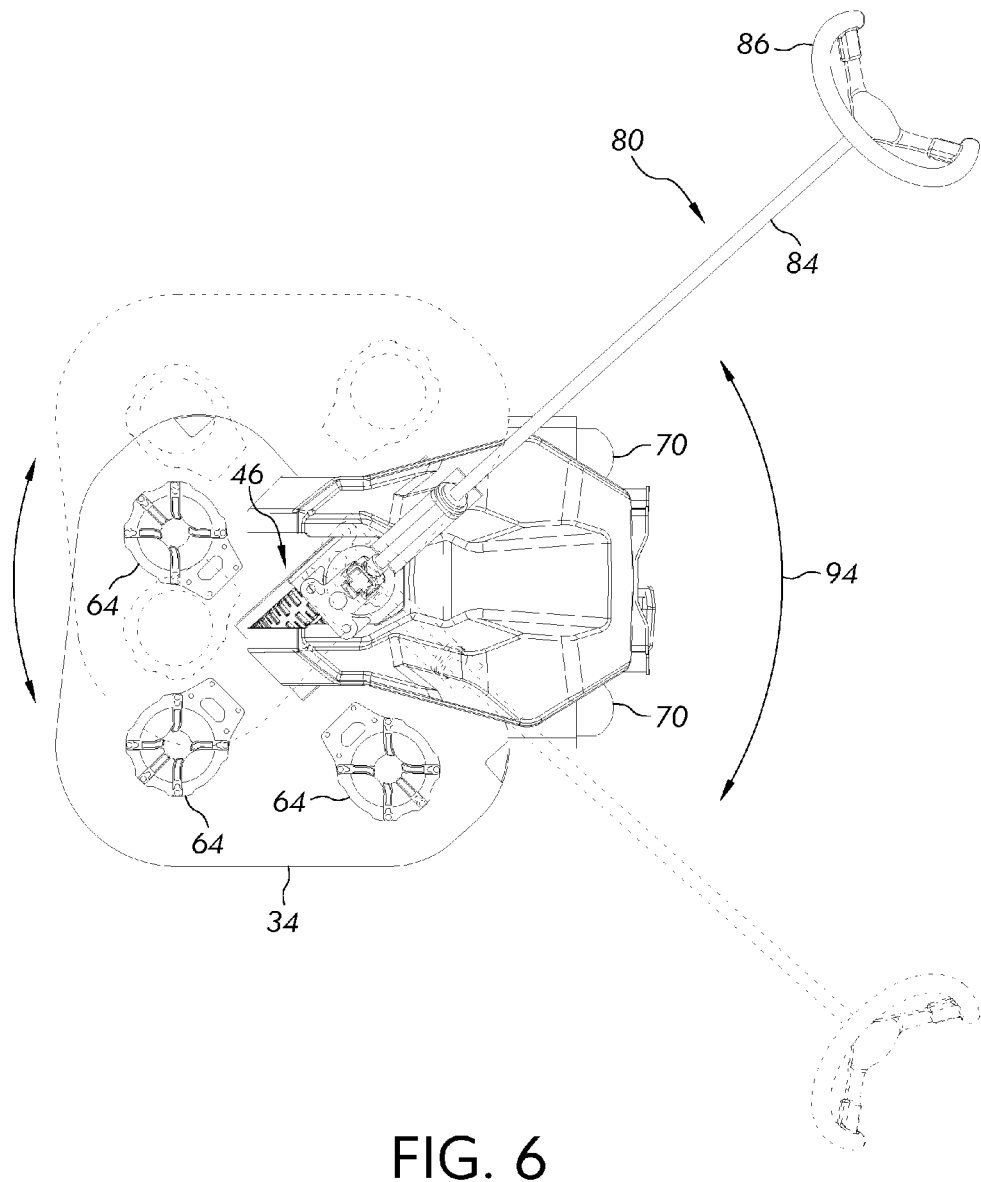

FIG. 6 is a top view of the mower showing the turning effect of the mower.

It should be noted that all the drawings are diagrammatic and not drawn to scale. Relative dimensions and proportions of parts of these figures may have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Turning to FIG. 1, an embodiment of a walk-behind mower 20 with steering wheel control is shown with a perspective view. The mower 20 includes a frame 24 that is constructed to provide a framework for many of the components of the mower 20. In broad terms, the mower 20 includes two sections, a front section 26 and a rear section 28. The front section 26 is rotatably attached to the rear section 28 about a vertical axis 30. As such, one of the front section 26 and rear section 28 can be rotated about the vertical axis 30 to create a steering effect.

The front section 26 includes a mower deck 34 that houses at least one mower blade assembly 36 (best seen in FIGS. 4 and 5). In one example, the mower blade assembly 36 can include solid, one-piece blades similar to typical lawn mower blades. In another example, the mower blade assembly 36 can include a dome-like shell 38 having a plurality of cutting blades 40 attached to the shell 38. In a particular example, the mower blade assembly 36 can include a high-efficiency blade assembly similar to or the same as the blade system further described in U.S. Patent Application having Ser. No. 62/325,159 and related applications. It is to be understood that other, similar systems can also be used such as the blade system as described in U.S. patent application having Ser. No. 15/166,378 and related applications. Additionally, as shown best in FIG. 5, the mower blade assemblies 36 can differ from each other when multiple mower blade assemblies 36 are utilized. These mower blade assemblies 36 can also have a path overlap, such that as the mower 20 travels in a forward direction (represented by arrow 44), the cutting paths of at least two mower blade assemblies 36 can cover some of the same vegetation (e.g., grass) to be cut.

In one example, the mower blade assembly 36 can be "quick-change," in other words requires no additional tools to attach and/or detach the mower blade assembly 36 from the mower 20. In another example, the individual cutting blades 40 can be quick-change blades. The described blade assemblies can greatly reduce the required power to rotate the cutting blades 40. Furthermore, the described blade assemblies 36 can increase battery run-time.

The front section 26 also includes a selectively steerable drive wheel 46. In the shown example, the selectively steerable drive wheel 46 includes two wheels 48. The selectively steerable drive wheel 46 is configured to turn about the vertical axis 30. The mower deck 34 is also connected to the selectively steerable drive wheel 46 such that as the selectively steerable drive wheel 46 rotates about the vertical axis 30, the mower deck rotates at the same rate.

The rear section 28 includes the frame 24 as shown in FIG. 4. A power source 50 can be attached to the frame 24. In the shown example the power source 50 is a battery or batteries 50 that are rechargeable. Turning to FIG. 5, the batteries provide electrical power for at least one electric drive motor 60 and at least one electric blade motor 64. In another embodiment, the power source 50 is an internal combustion engine. It should be understood by one having ordinary skill that the power source 50 can be any prime mover that is powered by fuel, electricity, or a hybrid-electric drive.

Power from the power source 50 enables operation of the electric drive motor 60. The electric drive motor is attached to the selectively steerable drive wheel 46 such that rotation of the electric drive motor 60 urges rotation of the selectively steerable drive wheel 46. As an associated operator calls for rotation of the selectively steerable drive wheel 46, power from the power source 50 rotates the electric drive motor. As can be appreciated, the signal for rotation can be varied to create a continuous range of acceleration within an upper limit and a lower limit.

As will be understood, the mower 20 includes an electric blade motor 64 for each mower blade assembly 36. In the shown example, the electric blade motors 64 are located on the top of the mower deck 34 and include a motor shaft 66 that passes through the mower deck 34. Each mower blade assembly 36 is attached to a motor shaft 66 such that rotation of the motor shaft 66 effects rotation of the mower blade assembly 36 in a desired forward or reverse direction.

The rear section 28 further includes a set of follower wheels 70 (e.g., caster wheels) attached to the frame 24. In one example, the follower wheels 70 are located in a rearward direction from the selectively steerable drive wheel 46. The shown example includes two follower wheels 70 to create a three-point base of wheels to support the frame 24 of the mower 20.

The mower 20 also includes a steering wheel assembly 80 attached to the frame 24 and the front section 26. As shown, the steering wheel assembly 80 includes a steering column 84 which extends upward and rearwardly for convenient use by an associated operator. The steering column 84 supports a steering wheel 86 which is attached thereto. The steering wheel 86 can include any number of controls such as blade on/off, forward/reverse direction, accelerator, operator presence control, etc. In one example, the steering column 84 can be located inside a hollow shaft 88. Operator rotation of the steering wheel 86 applies a rotational force to the steering column 84 to rotate the steering column 84.

The steering column 84 is attached to the frame 24 with a universal joint 90 such that when a rotational force is applied to the steering column 84, the rotational force causes the rear section 28 of the mower 20 to swing to the right or the left, represented by arrow 94, thereby steering the mower 20. In a particular example, the universal joint 90 is mounted directly above the selectively steerable drive wheel 46. In a more particular example, a centerline of a portion of the universal joint 90 is co-linear with the vertical axis 30. As such, the steering wheel assembly 80 applies a turning force to the frame 24 about the vertical axis 30 passing through the selectively steerable drive wheel 46. In a more particular example, the vertical axis 30 is co-linear with a centerline of the selectively steerable drive wheel 46.

The described mower can provide several benefits, one being the ability to turn the mower without having to follow the rear (such as behind a push handle on a typical walk-behind mower), thereby saving walking distance and energy for the operator. Another benefit can include a relatively tight turning radius for the mower to maneuver the mower about obstacles in a desired grass cutting path. Yet another benefit can include a 180° turn while the associated operator remains in the same general location.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A walk-behind mower, said walk-behind mower comprising:
   a frame;
   a power source attached to said frame;
   a selectively steerable drive wheel rotatably attached to said frame;
   a set of follower wheels attached to said frame;
   a steering wheel assembly attached to said frame, said steering wheel assembly comprising:
      a steering column;
      a steering wheel attached to said steering column;
   a universal joint connecting said steering wheel assembly to said frame;
   a mower deck attached to said frame; and
   a mower blade assembly attached to said deck,
   wherein said steering wheel assembly applies a force to said frame on a vertical axis passing through said selectively steerable drive wheel,
   wherein said vertical axis is co-linear with a vertical centerline of said steerable drive wheel.

2. The walk-behind mower according to claim 1, further comprising:
   a front section, wherein said front section comprises:
      said mower deck;
      said selectively steerable drive wheel;
   a rear section, wherein said rear section comprises:
      said frame; and
      said set of follower wheels.

3. The walk-behind mower according to claim 2, wherein said front section and said rear section are rotatably connected to each other.

4. The walk-behind mower according to claim 3, wherein one of said front section and said rear section is configured to rotate relative to the other of said front section and said rear section about a vertical axis.

5. The walk-behind mower according to claim 4, wherein one of said front section and said rear section is configured to rotate relative to the other of said front section and said rear section about a centerline of said selectively steerable drive wheel.

6. A walk-behind mower, said walk-behind mower comprising:
- a frame;
- a power source attached to said frame;
- a selectively steerable drive wheel rotatably attached to said frame;
- a set of follower wheels attached to said frame;
- a steering wheel assembly attached to said frame, said steering wheel assembly comprising:
  - a steering column;
  - a steering wheel attached to said steering column;
- a universal joint connecting said steering wheel assembly to said frame;
- a mower deck attached to said frame;
- a mower blade assembly attached to said deck,
- a front section, wherein said front section comprises:
  - said mower deck;
  - said selectively steerable drive wheel;
- a rear section, wherein said rear section comprises:
  - said frame; and
  - said set of follower wheels,
- wherein said front section and said rear section are rotatably connected to each other,
- wherein one of said front section and said rear section is configured to rotate relative to the other of said front section and said rear section about a vertical axis,
- wherein one of said front section and said rear section is configured to rotate relative to the other of said front section and said rear section about a centerline of said selectively steerable drive wheel.

* * * * *